(12) United States Patent
Stirrett et al.

(10) Patent No.: US 8,934,929 B2
(45) Date of Patent: Jan. 13, 2015

(54) METHOD AND APPARATUS PERTAINING TO CONVEYING CATEGORICALLY-CHARACTERIZING INFORMATION

(75) Inventors: Allan Jeffrey Stirrett, Waterloo (CA); Christopher F. Sartori, Waterloo (CA); Sanjay Nathwani, Waterloo (CA)

(73) Assignee: BlackBerry Limited, Waterloo (CA)

( * ) Notice: Subject to any disclaimer, the term of this patent is extended or adjusted under 35 U.S.C. 154(b) by 205 days.

(21) Appl. No.: 13/483,628

(22) Filed: May 30, 2012

(65) Prior Publication Data

US 2013/0324054 A1      Dec. 5, 2013

(51) Int. Cl.
*H04B 1/38*      (2006.01)

(52) U.S. Cl.
USPC .................. 455/466; 455/550.1; 455/575.1

(58) Field of Classification Search
CPC . H04M 1/00; H04M 1/72527; H04M 1/7253; H04M 1/72544; H04M 1/72552; G06Q 10/00; H04B 1/38
USPC ........ 455/422.1, 423, 424, 466, 67.11, 550.1, 455/557, 575.1
See application file for complete search history.

(56) References Cited

U.S. PATENT DOCUMENTS

| | | | |
|---|---|---|---|
| 6,604,132 B1 | 8/2003 | Hitt | |
| 8,115,595 B2 * | 2/2012 | Ryoo et al. | 340/10.1 |
| 8,116,791 B2 * | 2/2012 | Agiv | 455/466 |
| 8,594,637 B2 * | 11/2013 | Johnson | 455/414.1 |
| 2002/0169835 A1 | 11/2002 | Paul, Jr. et al. | |
| 2005/0198299 A1 | 9/2005 | Beck et al. | |
| 2005/0267738 A1 | 12/2005 | Wilkinson et al. | |
| 2006/0101124 A1 | 5/2006 | Landis | |
| 2006/0282536 A1 | 12/2006 | Popkin et al. | |
| 2009/0248812 A1 | 10/2009 | Fried et al. | |
| 2010/0011053 A1 | 1/2010 | Bhogal et al. | |
| 2010/0227631 A1 | 9/2010 | Bolton et al. | |
| 2010/0312844 A1 | 12/2010 | Katis et al. | |
| 2011/0171937 A1 | 7/2011 | Hill et al. | |
| 2013/0024780 A1 * | 1/2013 | Sutedja et al. | 715/752 |

FOREIGN PATENT DOCUMENTS

WO      2011/136822 A1      11/2011

OTHER PUBLICATIONS

Ziade, Francois; Authorized Officer; PCT Search Report and Written Opinion from related PCT/CA2013/050418 dated Aug. 27, 2013; 7 pages.
Bluetooth Doc. Car Working Group; "Message Access Profile," Bluetooth specification; XP002685988; Jun. 4, 2009; 80 pages.
Extended European Search Report from related European Patent Application No. 12170124.7 dated Nov. 9, 2012; 9 pages.
Article 94(3) from related European Patent Application No. 12170124.7 dated Jun. 24, 2014; 5 pages.

* cited by examiner

*Primary Examiner* — Thanh Le
(74) *Attorney, Agent, or Firm* — Fitch, Even, Tabin & Flannery, LLP

(57) ABSTRACT

An apparatus receives a first wireless message via a first wireless transceiver, which first wireless message includes a content payload. The apparatus categorizes this first wireless message (for example, with respect to service type, a specific service, and/or a communication thread) and transmits, via a second wireless transceiver, a second message that includes the categorization information but not all (or necessarily even any) of the content payload. Upon then receiving, via that second wireless transceiver, a corresponding third message the apparatus determines a need to forward the content payload via that second wireless transceiver.

14 Claims, 4 Drawing Sheets

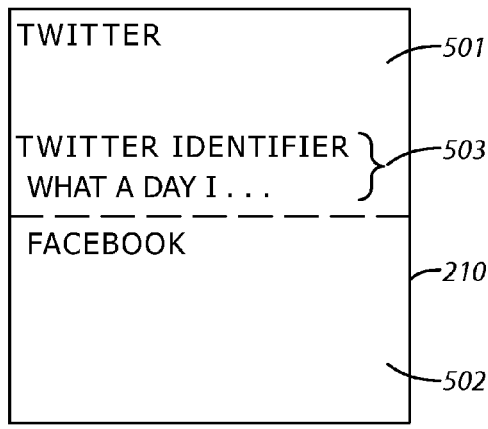
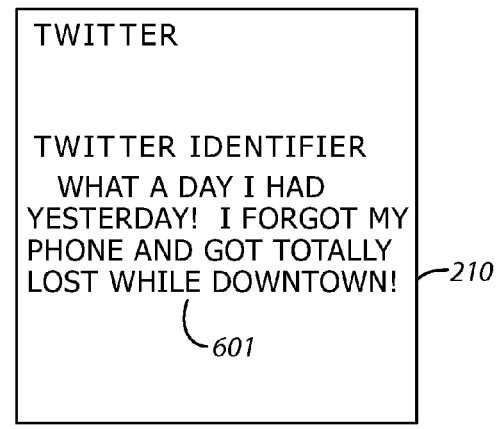
*FIG. 5*   *FIG. 6*
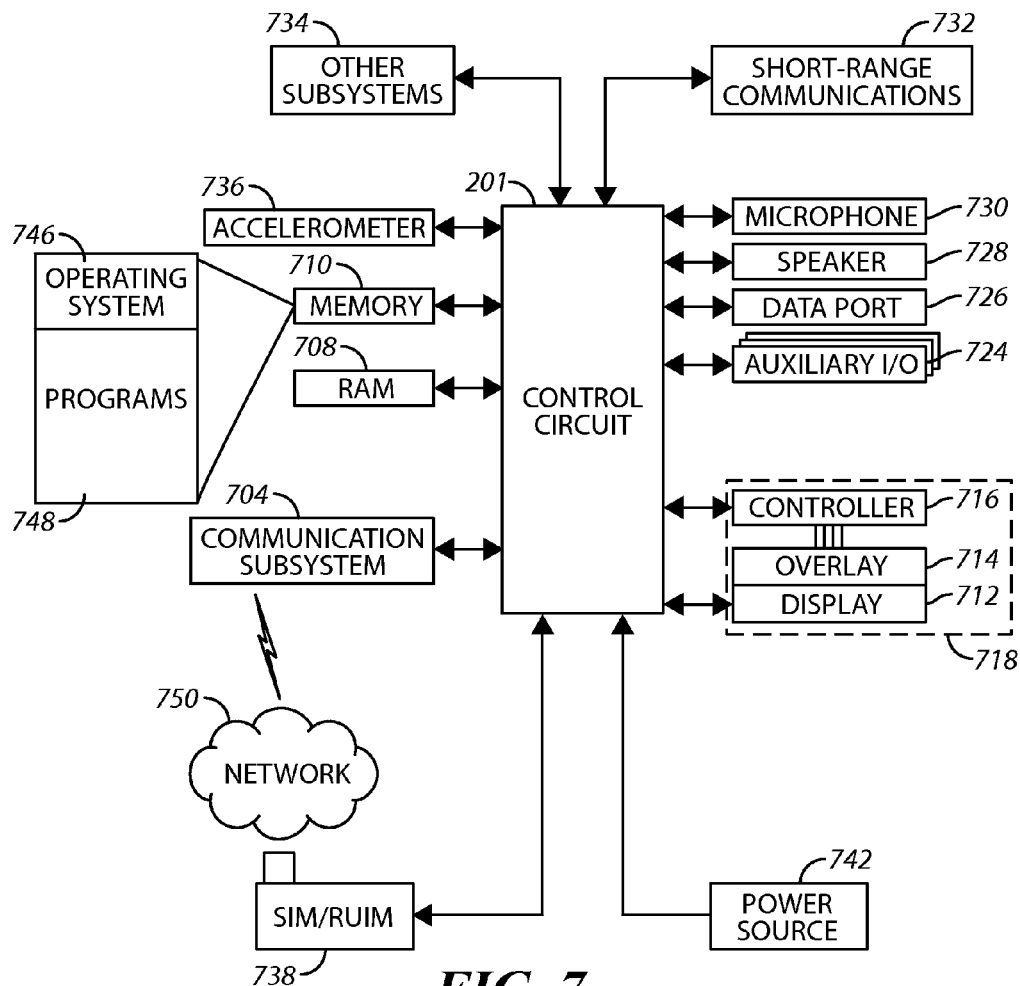
*FIG. 7*

METHOD AND APPARATUS PERTAINING TO CONVEYING CATEGORICALLY-CHARACTERIZING INFORMATION

FIELD OF TECHNOLOGY

The present disclosure relates to wireless portable communications devices and more particularly to the conveyance of categorically-different content.

BACKGROUND

Electronic devices, including portable communication devices, have gained widespread use. Portable communication devices include, for example, several types of mobile stations such as simple cellular telephones, smart telephones, wireless personal digital assistants (PDAs), laptop computers, tablet computers, and so forth.

Many of these portable communication devices have both longer-range and short-range communications capabilities. Bluetooth™-based communications represent a particularly ubiquitous example of a short-range wireless communications capability as regards a wide variety of consumer-based portable communication devices. A wide variety of electronic devices are able to link and communicate using the Bluetooth™ standard.

For example, modern automobiles often have an in-vehicle media center that supports a wide variety of vehicle-specific capabilities (such as providing information to the driver regarding vehicular operating parameters, trip details, location-based information) in addition to supporting an in-vehicle sound system (to support, for example, the playback of pre-recorded music and/or to audibilize received commercial radio station broadcasts). Increasingly, such media centers are also provided with a Bluetooth™ transceiver to permit the media center to wirelessly connect to, for example, a smartphone and thereby extend some of the functionality of the smartphone to the media center.

For some application purposes the foregoing works seamlessly. For example, the Bluetooth™ standard readily permits the smartphone to stream music content to such a media center and for the latter to render that music audible via the media center's acoustic resources.

Unfortunately, short-range communications standards like Bluetooth™ do not necessarily support, in a straight-forward and native manner, all functionality that a user might desire. As one example in these regards, Bluetooth™ is not able to natively forward, in a service-segregated manner, the various messages that correspond to the many (and growing number of) social-media services that are now available. As a more specific example, a Twitter™ Tweet™ cannot be natively sent as a "Tweet" via Bluetooth™. While Bluetooth™ will readily accommodate email as "email," the Bluetooth™ standard is not designed to preserve the categorical sense of a Tweet™ as corresponding to the Twitter™ social-media service.

BRIEF DESCRIPTION OF THE DRAWINGS

FIG. 5 is a screen shot in accordance with the disclosure.
FIG. 6 is a screen shot in accordance with the disclosure.
FIG. 7 is a block diagram in accordance with the disclosure.

DETAILED DESCRIPTION

Figure 1:
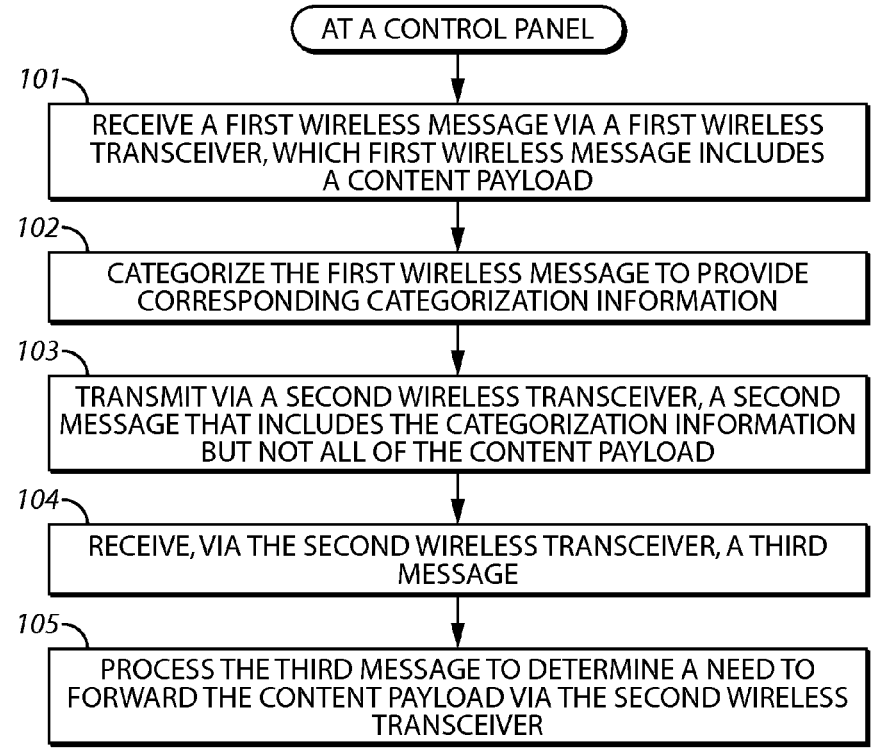
FIG. 1 is a flow diagram in accordance with the disclosure.

The following describes an apparatus and method pertaining to receiving a first wireless message via a first wireless transceiver, which first wireless message includes a content payload. The apparatus categorizes this first wireless message (for example, with respect to service type, a specific service, and/or a communication thread) and transmits, via a second wireless transceiver, a second message that includes the categorization information but not all (or necessarily even any) of the content payload. Upon then receiving, via that second wireless transceiver, a corresponding third message the apparatus determines a need to forward the content payload via that second wireless transceiver.

A counterpart apparatus, upon receiving that first message, uses that categorization information to present categorically-parsed information regarding availability of the message content on a display. If and when a user should then make a corresponding selection in those regards, this counterpart apparatus can transmit the aforementioned third message to facilitate receiving the message content and providing that message content to the user.

By one approach the aforementioned second message (which includes the categorization information) can also include a unique non-address identifier. In this case, returning that unique non-address identifier in the aforementioned third message can itself serve as the indication to now forward the message content.

So configured, for example, the native email-handling capability of the Bluetooth™ standard can also accommodate moving categorically-different content from one platform to another without losing those categorical distinctions. Accordingly, a Tweet™ can remain a Tweet™, a Facebook™ update can remain a Facebook™ update, and a LinkedIn™ comment can remain a LinkedIn™ comment notwithstanding that the Bluetooth™ standard does not inherently provide for such categorical distinctions.

These teachings will permit, for example, a smartphone to forward its received social-media content from a variety of such service providers to an in-vehicle media center and for the latter to display the availability of such content in a way that readily preserves the categorical distinctions between such content. The user, in turn, can easily understand the nature and type of their incoming content just as if they were viewing the smartphone.

These teachings are readily applied in conjunction with a variety of platforms and message types and hence can serve to greatly leverage the continued viability and utility of such practices. These teachings are also highly scalable in practice and will accommodate essentially any type and any number of categorical types of message content as may be desired.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that comports with many of the present teachings. For the sake of illustration but without intending any particular limitations in these regards, this process 100 is presented as being carried out by a control circuit of choice. With momentary reference to FIG. 2, this control circuit 201 can comprise a part of an apparatus 200 such as, but not limited to, a portable communications device (such as a so-called smartphone or tablet computer).

In this example the enabling apparatus 200 the control circuit 201 can integrally include (or otherwise operably couple to) a memory. Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

This apparatus 200 also includes both a first wireless transceiver 202 and a second wireless transceiver 203. The first wireless transceiver 202 can support longer-range communications (for example, a range greater than about thirty meters and up to many kilometers) while the second wireless transceiver 203 can comprise a short-range transceiver. So configured, the apparatus 200 can employ the first wireless transceiver 202 to communicate using an appropriate signaling protocol 204 (such as any of a variety of cellular-telephony protocols, WiFi protocols, and so forth) to communicate with and via one or more networks 205 (including cellular-telephony networks, the Internet, and so forth). The second wireless transceiver 203, in turn, can serve to facilitate short-range wireless communications using a first protocol 206 such as, by way of example, the Bluetooth™ protocol (which has an effective range, per the Bluetooth™ standard, of about ten meters).

Figure 2:
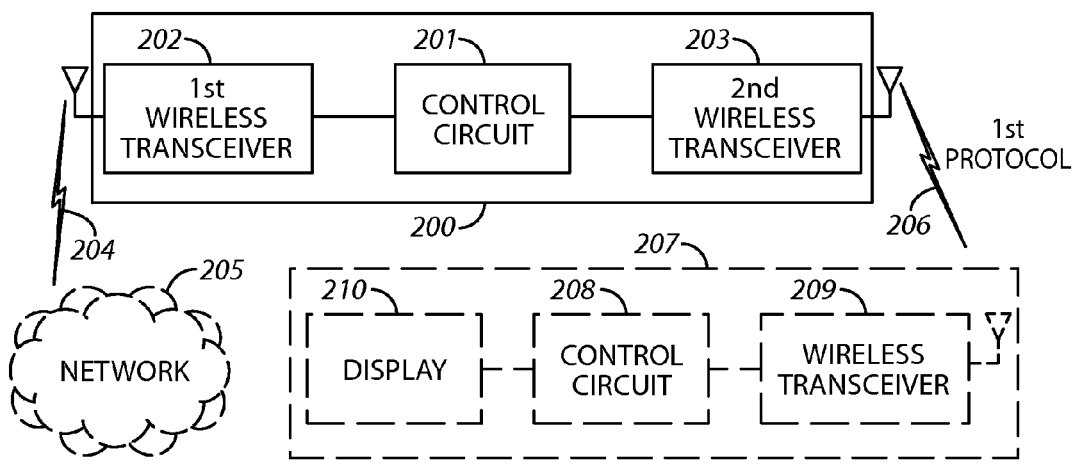
FIG. 2 is a block diagram in accordance with the disclosure.

Referring now to both FIGS. 1 and 2, this process 100 provides, at step 101, for receiving a first wireless message via the first wireless transceiver 202. This first wireless message includes content payload appropriate to the nature and type of message service. For example, if the first wireless message comprises an email, then the content payload will include the textual body of an email. If the first wireless message comprises, instead, a Tweet™, then the content payload will comprise the volume-limited textual content of a Tweet™.

At step 102, the control circuit categorizes this first wireless message to thereby provide corresponding categorization information. The specific nature of this categorization can vary with the application setting. For many purposes, however, this categorization can serve to categorize the message with respect to service type and/or a specific service. By way of an illustrative example and without intending any limitations in these regards, such categorization can comprise categorizing the message as corresponding to an email service (or to a particular email service such as the Yahoo™ email service or the Gmail™ email service), or the Twitter™ service, or the Facebook™ or LinkedIn™ update services, and so forth as appropriate.

By another approach, employed in combination with the foregoing or in combination therewith, this step 102 can comprise categorizing the message with respect to an existing communications thread. In such a case, and by way of example, an incoming message that comprises a reply to an earlier sent email can be categorized, at least in part, as being associated with that earlier sent email. (The basic concept of a conversational "thread" is well known in the art and accordingly further elaboration will not be provided here for the sake of brevity.)

At step 103, the control circuit then employs the second wireless transceiver 203 to transmit a second message that includes the categorization information for the first wireless message. For example, if the first wireless message is categorized as being a Twitter™ Tweet™, then this step 103 can comprise transmitting information regarding that categorization.

This step 103 will accommodate also transmitting in this second message a portion of the content payload, if desired, but not all of the content payload. For example, the first few words or some maximum number of alphabetic characters of the content payload may be included in the second message, but not the complete textual content of the first wireless message.

As illustrated in FIG. 2, this second wireless message can be transmitted via the second wireless transceiver's 203 short-range capabilities to another apparatus 207. This other apparatus 207 includes a wireless transceiver 209 that compatibly receives the transmissions of the second wireless transceiver 203. A control circuit 208 operably couples to this wireless transceiver 209 and also to a local display 201. So configured, the control circuit 208 can present part or all of the second wireless message as desired. Further description in these regards appears further below.

At step 104, the apparatus 200 receives, via the second wireless transceiver 203 (and therefore via, in this example, a Bluetooth™-compatible transmission from the second apparatus 207), a third wireless message. The control circuit 201 processes this third message at step 105 to determine a need to forward the content payload for the first wireless message via the second wireless transceiver 203 to the second apparatus 207. Again, further description in these regards appears further below. When such a need exists, the control circuit 201 can respond accordingly and transmit the full content payload to the second apparatus 207 via the second wireless transceiver 203.

Bluetooth™, of course, does not preserve most (or even any in some cases) of the categorical distinctions that separate one kind of social-media service from another. Bluetooth™ will, however, support email. Accordingly, by one approach, the second and third wireless messages described above comprise email messages.

By one approach, the subject line of the email message that comprises the second wireless message (i.e., the message sent to forward the categorization information) can include a unique non-address identifier (i.e., an identifier that does not identify a party as does an email address or the like). This unique non-address identifier can assume a variety of forms and relative uniqueness as desired. By one approach, and for the sake of example, this unique non-address identifier can comprise a sixty-four integer hash code that the control circuit 201 selects (or generates at the time of need) for this use and correlates to the content payload of the first wireless message.

In such a case, the third wireless message can also include that same unique non-address identifier (for example, again in the subject line of an email). The control circuit 201, upon detecting the presence of that unique non-address identifier, is able to determine the need to forward the content payload of the first wireless message (and respond accordingly).

Figure 3:
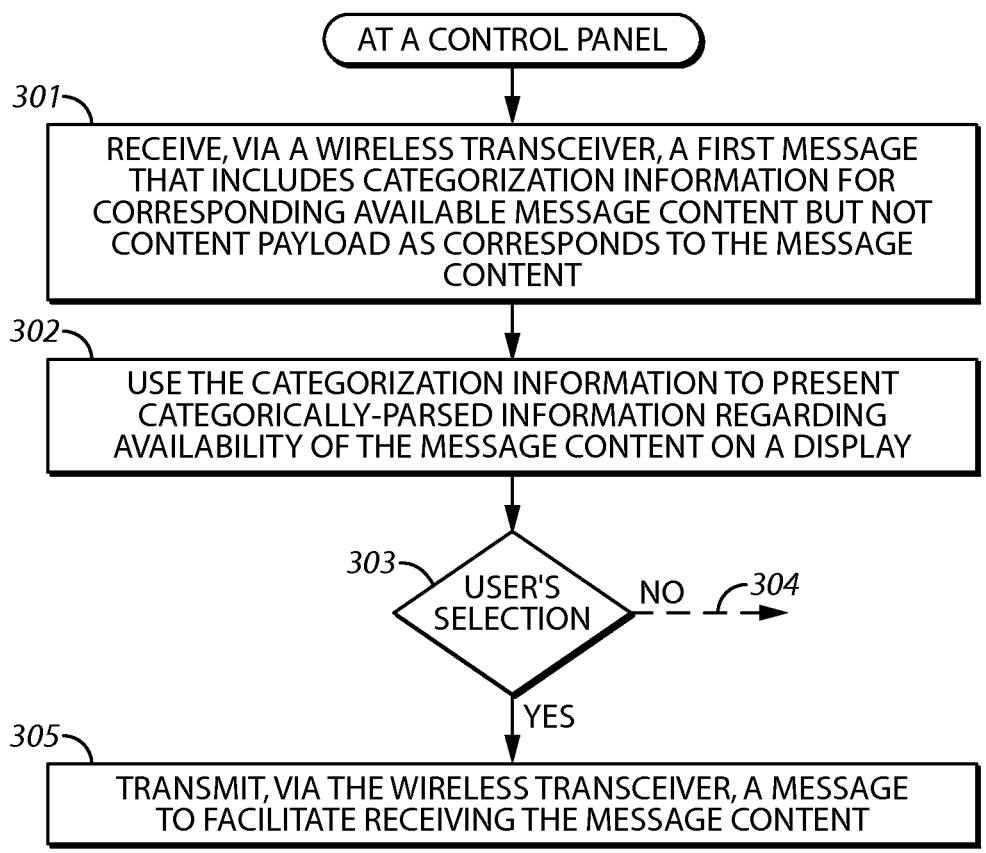
FIG. 3 is a flow diagram in accordance with the disclosure.

FIG. 3 provides an illustrative process 300 that the other apparatus 207 can employ in these same regards. In this example, at step 301, the control circuit 208 of the other apparatus 207 receives, via the local wireless transceiver 209, the aforementioned second wireless message that contains the aforementioned categorization information for corresponding available message content. For the sake of example, it will be presumed that this categorization information categorizes the content payload as being a Tweet™. In this example this message also includes a small part of the Tweet's text but not all of the content payload itself.

To continue the example begun above, this can include also receiving the aforementioned unique non-address identifier as well (for example, in the subject line of the email that constitutes this message).

At step 302, this control circuit 208 then uses that categorization information to present categorically-parsed information regarding the availability of the message content on the display 210. FIG. 5 presents a simple example in these regards. In this example the display 201 is parsed into two categorically-different windows 501 and 502. The first window 501 presents Twitter™-based content while the second window 502 presents Facebook™-based content. Since the received message is categorically identified as a Tweet™, the control circuit 208 causes the availability of this content to be presented in the Twitter™-based content area 501. In this example, this identification 503 includes an identifier for the party Tweeting the content along with a few words from the beginning of the Tweet™.

Accordingly, although Bluetooth™ does not natively support a Tweet™ in a way that inherently preserves the categorical distinction of that social-networking service, these teachings nevertheless preserve that categorical distinction while utilizing Bluetooth™ to convey the availability of the Tweet™ content.

Referring again to FIG. 3, if and when the control circuit 208 detects 303 that the user selects this particular item of content (i.e., the Tweet™), the control circuit 208 responds at step 305 by transmitting, again via the local wireless transceiver 209, the aforementioned third message (including the previously-received unique non-address identifier) to thereby facilitate receive the message content. As illustrated in FIG. 6, upon receiving that full content (in this case of the Tweet™) the control circuit 208 can now present the complete text 601 of the Tweet™.

In the absence of detecting 303 this trigger event this process 300 can accommodate any of a variety of responses 304. Examples of responses can include temporal multitasking (pursuant to which the control circuit 208 conducts other tasks before returning to again monitor for the selection event) as well as continually looping back to essentially continuously monitor for the selection event. These teachings also accommodate supporting this detection activity via a real-time interrupt capability if desired.

Pursuant to these teachings, the aforementioned content can be transmitted and received as the body of an email regardless of whether the categorization information categorizes the message content as being, in fact, email content. Instead, and notwithstanding that the content arrives as the body of an email, the control circuit 208 associates the content categorically as not only a Tweet™ but as a particular Tweet™.

Figure 4:
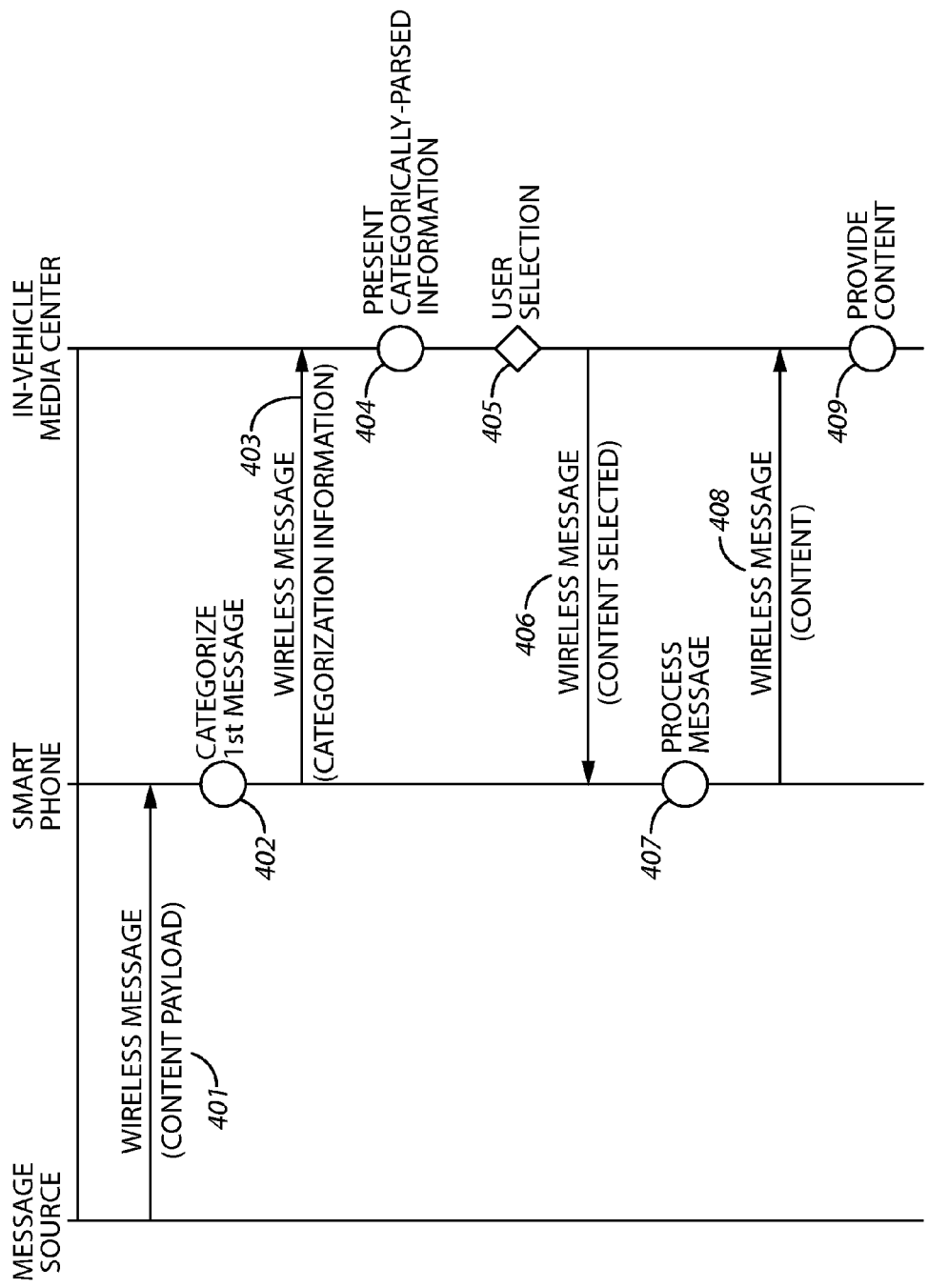
FIG. 4 is a call-flow diagram in accordance with the disclosure.

FIG. 4 provides an overall illustrative example consistent with such an approach. In this example, a smartphone receives a wireless message 401 from a message source (in this example, the Twitter™ social-networking service) that includes a content payload (i.e., in this example, the text of a Tweet™ and the identifier for the Tweeting party). The smartphone categorizes 402 this message to thereby provide yield corresponding categorization information (i.e., in this case, that the message comprises a Tweet™) and transmits a wireless message 403 to an in-vehicle media center (using the Bluetooth™ protocol) that includes this categorization information along with a unique non-address identifier.

The in-vehicle media center, in turn, presents 404 on its display categorically-parsed information regarding the available content payload (i.e., by presenting a Tweet™ as a "Tweet") and awaits a user selection 405 of this available content. When the user makes this selection, the in-vehicle media center transmits (via Bluetooth™) a wireless message to indicate selection of this particular content by including at least the unique non-address identifier that correlates to this particular content.

The smartphone receives that message and processes 407 the message (for example, by noting the presence of the unique non-address identifier) to determine the need to send the complete content payload to the in-vehicle media center. The smartphone responds by now transmitting, again via Bluetooth™, a wireless message 408 that includes that content and the in-vehicle media center provides 409 that content via its display to the user.

By one approach, the email address of the sending party for the messages from the smartphone to the in-vehicle media center can comprise a fabricated construct. In particular, the reply address need not comprise an actual, genuine email address but rather a reply address that these platforms can recognize in a way that supports these teachings. For example, by one approach the reply address can include the aforementioned categorical information. When, for example, the categorical information categorizes the content payload as a Tweet™, the reply address for the email from the smartphone to the in-vehicle media center could read, "twitter@smartphone.com." Although the latter address may not actually exist as a genuine email address, the two control circuits could be configured to recognize this expression as conveying the desired categorization information.

As noted above these teachings can be implemented using any of a variety of portable communication devices. FIG. 7 provides an illustrative example in these regards and depicts in particular an exemplary portable communication device that includes the aforementioned control circuit 201 to control the overall operation of the portable communication device.

Communication functions, including data and voice communications, are performed through a communication subsystem 704 that can include the aforementioned first wireless transceiver 202. The communication subsystem receives messages from and sends messages to a wireless network 750. The wireless network 750 may be any type of wireless network, including, but not limited to, data wireless networks, voice wireless networks, and networks that support both voice and data communications.

A power source 742, such as one or more rechargeable batteries or a port to an external power supply, powers the communication device.

The control circuit 201 interacts with other elements, such as Random Access Memory (RAM) 708, a long-term memory 710, a display 712 with a touch-sensitive overlay 714 operably coupled to an communication controller 716 that together comprise an optional touch-sensitive display 718, an auxiliary input/output (I/O) subsystem 724, a data port 726, a speaker 728, a microphone 730, a short-range communication subsystem that includes the aforementioned second wireless transceiver 203, and other device subsystems 734 of choice.

One or more user interfaces are provided. Input via a graphical user interface is provided via the touch-sensitive overlay 714. The control circuit 201 interacts with the touch-sensitive overlay 714 via the communication controller 716. Information, such as text, characters, symbols, images, icons, and other items that may be displayed or rendered on a portable communication device, is displayed on the touch-sensitive display 718 via the control circuit 201.

The control circuit 201 may interact with an accelerometer 736 that may be utilized to detect direction of gravitational forces or gravity-induced reaction forces.

To identify a subscriber for network access, the portable communication device may utilize a Subscriber Identity Module or a Removable User Identity Module (SIM/RUIM) card 738 for communication with a network, such as the wireless network 750. Alternatively, user identification information may be programmed into the memory 710.

The portable communication device includes an operating system 746 and software programs, applications, or components 748 that are executed by the control circuit 201 and are typically stored in a persistent, updatable store such as the memory 710. Additional applications or programs may be loaded onto the portable communication device through the wireless network 750, the auxiliary I/O subsystem 724, the data port 726, the short-range communications subsystem 732, or any other suitable subsystem 734. The memory 710 may comprise a non-transitory storage media that stores executable code which, when executed, causes one or more of functions or actions as described herein.

A received signal such as a text message, an e-mail message, or web page download is processed by the communication subsystem and input to the control circuit 201. In addition to the content-handling activities described above, the control circuit 201 processes the received signal for output to the display 712 and/or to the auxiliary I/O subsystem 724. A subscriber may generate data items, for example e-mail messages, which may be transmitted over the wireless network 750 through the communication subsystem.

For voice communications, the overall operation of the portable communication device is similar. The speaker 728 outputs audible information converted from electrical signals, and the microphone 730 converts audible information into electrical signals for processing.

The touch-sensitive display 718 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 714. The overlay 714 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

Pursuant to these teachings, the numerous social-networking services with which many persons interact via their smartphones are able to extend that capability to other platforms notwithstanding that the wireless communication path to support that extension does not itself provide native support for many of those social-networking services. In particular, these teachings permit an end user to view and interact with their social-networking services, essentially regardless of their categorical differences from one another, in a highly transparent and intuitive manner. By providing this capability without modifying the underlying communication protocol these teachings can serve to greatly leverage the continued viability and utility of the existing installed base of short-range protocols such as Bluetooth™.

The present disclosure may be embodied in other specific forms without departing from its essential characteristics. As but one illustrative example in these regards, these teachings will accommodate having the sourcing platform provide the remote platform with one or more candidate responses that can also be displayed via the remote platform to the user in conjunction with presenting the categorically-parsed information and/or the content payload. For example, when dealing with an SAP application, possible responses could include, "Approved," "Rejected," "More information is required," and "Queue for further analysis." As another example, when dealing with a Facebook communication, possible responses could include, "Yes," "No," "I'll be there in XXX minutes," "I'm late," or "Call me."

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:
1. An apparatus comprising:
a first wireless transceiver;
a second wireless transceiver configured to communicate via a first protocol;
a control circuit operably coupled to the first wireless transceiver and the second wireless transceiver and configured to:
receive a first wireless message via the first wireless transceiver, which first wireless message includes a content payload;
categorize the first wireless message to provide corresponding categorization information;
transmit, via the second wireless transceiver, a second message that includes the categorization information but not all of the content payload;
receive, via the second wireless transceiver, a third message;
process the third message to determine a need to forward the content payload via the second wireless transceiver.
2. The apparatus of claim 1 wherein the apparatus comprises a portable communications device.
3. The apparatus of claim 1 wherein the control circuit is configured to categorize the first wireless message based upon at least one of:
a service type;
a specific service;
a communication thread.
4. The apparatus of claim 1 wherein the control circuit is further configured to transmit, via the second wireless transceiver and as part of the second message, a unique non-address identifier.
5. The apparatus of claim 4 wherein the control circuit is further configured to process the third message to determine a need to forward the content payload via the second wireless transceiver, at least in part, by processing the third message to detect the unique non-address identifier.
6. The apparatus of claim 4 wherein he control circuit is further configured to process the third message to determine a need to forward the content payload via the second wireless transceiver, at least in part, as a function of a recipient address as corresponds to the third message.
7. The apparatus of claim 1 wherein the control circuit is further configured, in response to determining a need to forward the content payload via the second wireless transceiver, transmitting the content payload as the body of an email via the second wireless transceiver.

8. A method comprising:

at a control circuit:

receiving a first wireless message via a first wireless transceiver, which first wireless message includes a content payload;

categorizing the first wireless message to provide corresponding categorization information;

transmitting, via a second wireless transceiver, a second message that includes the categorization information but not all of the content payload;

receiving, via the second wireless transceiver, a third message;

processing the third message to determine a need to forward the content payload via the second wireless transceiver.

9. The method of claim 8 wherein the control circuit is configured to categorize the first wireless message based upon at least two of:

a service type;

a specific service;

a communication thread.

10. The method of claim 8 wherein:

transmitting the second message further comprises transmitting as part of the second message a unique non-address identifier; and processing the third message to determine a need to forward the content payload via the second wireless transceiver comprises, at least in part, processing the third message to detect the unique non-address identifier.

11. An apparatus comprising:

a wireless transceiver;

a display;

a control circuit operably coupled to the wireless transceiver and the display and configured to:

receive, via the wireless transceiver, a first message that includes categorization information for corresponding available message content but not all content payload as corresponds to the message content;

use the categorization information to present categorically-parsed information regarding availability of the message content on the display;

upon detecting a user's selection of the categorically-parsed information, transmitting, via the wireless transceiver, a message to facilitate receiving the message content.

12. The apparatus of claim 11 wherein the categorization information categorizes the message content based upon at least two of:

a service type;

a specific service;

a communication thread.

13. The apparatus of claim 11 wherein the first message further includes a unique non-address identifier and wherein transmitting the message to facilitate receiving the message content includes transmitting the unique non-address identifier.

14. The apparatus of claim 11 wherein the control circuit is further configured to:

receive the message content as the body of an email regardless of whether the categorization information categorizes the message content as email content.

* * * * *

UNITED STATES PATENT AND TRADEMARK OFFICE
CERTIFICATE OF CORRECTION

| | | |
|---|---|---|
| PATENT NO. | : 8,934,929 B2 | Page 1 of 1 |
| APPLICATION NO. | : 13/483628 | |
| DATED | : January 13, 2015 | |
| INVENTOR(S) | : Allan Jeffrey Stirrett et al. | |

It is certified that error appears in the above-identified patent and that said Letters Patent is hereby corrected as shown below:

IN THE CLAIMS:

Claim 6, column 8, line 58, after "wherein" delete "he" and insert --the--.

Signed and Sealed this
Twenty-eighth Day of April, 2015

Michelle K. Lee
*Director of the United States Patent and Trademark Office*